(12) United States Patent
Grau Sorarrain et al.

(10) Patent No.: US 10,116,188 B2
(45) Date of Patent: Oct. 30, 2018

(54) FAN DIRECTING ELEMENT FOR AN ELECTRIC MACHINE

(71) Applicant: Siemens Aktiengesellschaft, Munich (DE)

(72) Inventors: Esteban Grau Sorarrain, Dusseldorf (DE); Christian Jäkel, Duisburg (DE); Mario Koebe, Mulheim an der Ruhr (DE); Matthias Kowalski, Mulheim an der Ruhr (DE); Christoph Lehmann, Neukirchen-Vluyn (DE); Andrey Mashkin, Cologne (DE); Olga Plotnikova, Wuppertal (DE); Carolin Schild, Mulheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 164 days.

(21) Appl. No.: 15/027,618

(22) PCT Filed: Sep. 12, 2014

(86) PCT No.: PCT/EP2014/069529
§ 371 (c)(1),
(2) Date: Apr. 6, 2016

(87) PCT Pub. No.: WO2015/055360
PCT Pub. Date: Apr. 23, 2015

(65) Prior Publication Data
US 2016/0254729 A1    Sep. 1, 2016

(30) Foreign Application Priority Data
Oct. 14, 2013  (EP) .................................... 13188496

(51) Int. Cl.
*H02K 9/06* (2006.01)
*H02K 9/08* (2006.01)

(52) U.S. Cl.
CPC ................. *H02K 9/06* (2013.01); *H02K 9/08* (2013.01); *H02K 2213/09* (2013.01)

(58) Field of Classification Search
CPC ......... H02K 9/06; H02K 9/08; H02K 2213/09
(Continued)

(56) References Cited

U.S. PATENT DOCUMENTS 2,970,233 A * 1/1961 Penney ..................... H02K 9/06
                                                    310/59
5,311,089 A * 5/1994 Stroetgen ................ H02K 9/06
                                                    310/50
(Continued)

FOREIGN PATENT DOCUMENTS

CN     1109225 A     9/1995
CN     101253670 A   8/2008
(Continued)

OTHER PUBLICATIONS

JP Office Action dated Jun. 26, 2017, for JP patent application No. 2016522784.
(Continued)

*Primary Examiner* — Burton Mullins
(74) *Attorney, Agent, or Firm* — Beusse Wolter Sanks & Maire

(57) ABSTRACT

An electric machine having a stator and a rotor arranged on an axis of rotation and a first fan, which extends in the radial direction on one section of the axis of rotation and delivers a coolant flow into the electric machine during operation. The electric machine further includes a fan directing element, which interacts with the first fan and deflects at least a proportion of the coolant flow. Variable and demand-based cooling of the electric machine can be achieved by the fan directing element, which can in particular be adjustable.

10 Claims, 1 Drawing Sheet

(58) Field of Classification Search
USPC ........................................ 310/58, 60 A, 60 R
See application file for complete search history.

(56) References Cited

U.S. PATENT DOCUMENTS

| | | | |
|---|---|---|---|
| 5,602,435 A | | 2/1997 | Iseli et al. |
| 5,904,471 A | * | 5/1999 | Woollenweber ........ F02B 37/16 |
| | | | 417/307 |
| 6,570,276 B1 | * | 5/2003 | Morel ................... F04D 25/082 |
| | | | 310/52 |
| 6,700,238 B1 | * | 3/2004 | Tong ........................ H02K 9/12 |
| | | | 310/52 |
| 7,166,939 B2 | * | 1/2007 | Voigt ...................... B25F 5/008 |
| | | | 310/47 |
| 2009/0146512 A1 | * | 6/2009 | Yoshizawa ............... H02K 9/06 |
| | | | 310/53 |

FOREIGN PATENT DOCUMENTS

| | | |
|---|---|---|
| CN | 201985650 U | 9/2011 |
| EP | 0639883 A1 | 2/1995 |
| GB | 1173245 A | 12/1969 |
| JP | H07250454 A | 9/1995 |
| JP | 2000041362 A | 2/2000 |
| JP | 2001298906 A | 10/2001 |

OTHER PUBLICATIONS

CN Office Action dated Sep. 4, 2017, for CN patent application No. 201480056585.7.

\* cited by examiner

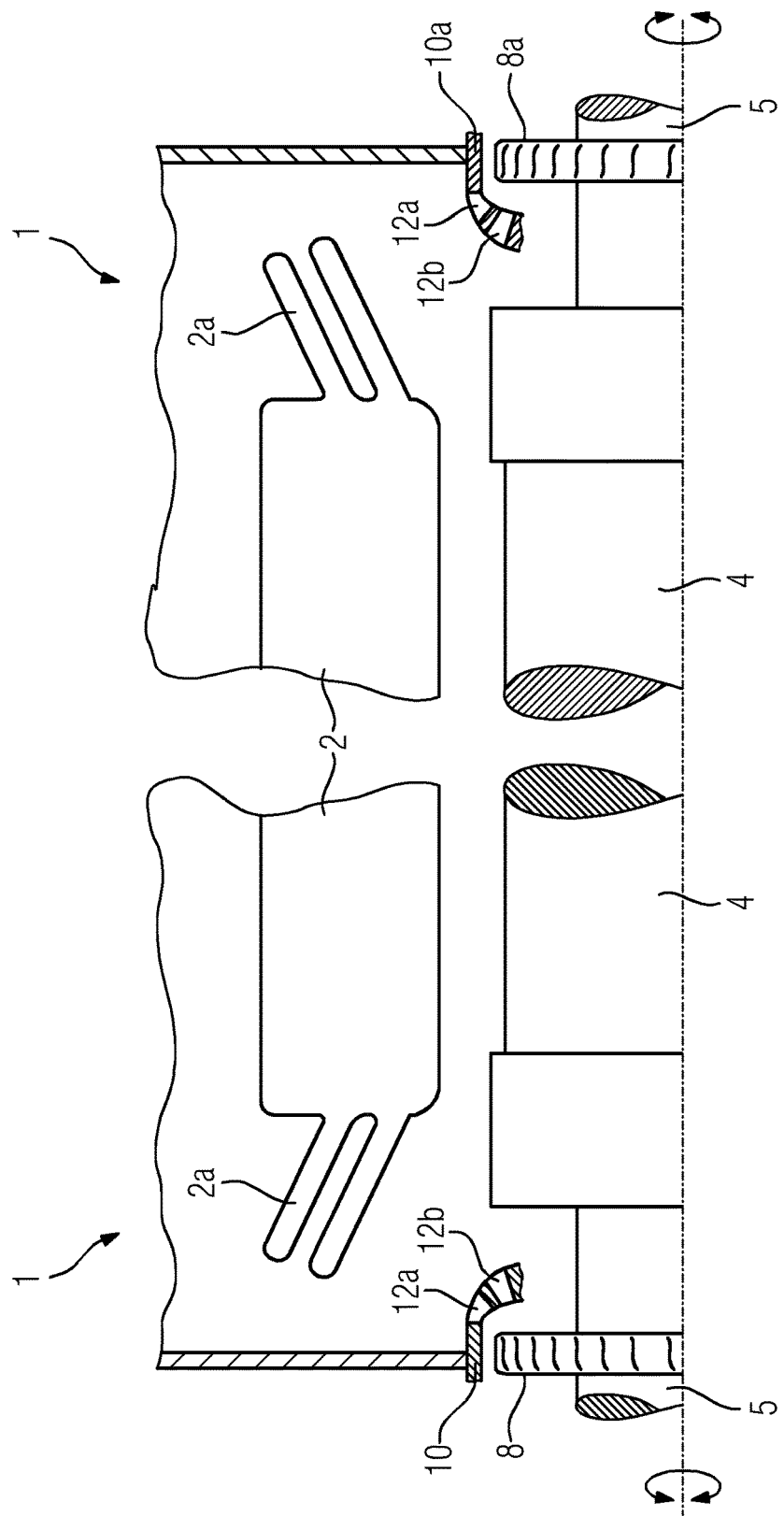

FAN DIRECTING ELEMENT FOR AN ELECTRIC MACHINE

CROSS REFERENCE TO RELATED APPLICATIONS

This application is the US National Stage of International Application No. PCT/EP2014/069529 filed Sep. 12, 2014, and claims the benefit thereof. The International Application claims the benefit of European Application No. EP13188496 filed Oct. 14, 2013. All of the applications are incorporated by reference herein in their entirety.

FIELD OF INVENTION

The invention relates to an electric machine comprising a stator and a rotor, which is arranged on an axis of rotation, and comprising at least one first fan, which during operation delivers a coolant flow into the electric machine, and also relates to a fan directing element, by means of which at least one proportion of the coolant flow is deflected.

BACKGROUND OF INVENTION

As is known, losses in the form of heat occur in electric machines, such as generators, during the conversion of mechanical energy into electrical energy, and vice versa. It is therefore necessary to cool active components, i.e. those in which losses occur, as efficiently as possible. A maximum permissible limit value temperature is given from the insulating material classes, which electrically insulate current-conveying components from one another and with respect to the housing. During operation it must be ensured that these limit value temperatures are not exceeded, since otherwise the necessary insulation is no longer provided.

In addition, due to the resultant heating of the electric machine, the maximum performance at which the electric machine can be operated is limited. There is thus an interest in cooling the electric machine as efficiently as possible.

Cooling circuits that dissipate heat from the interior of the generator by means of a thermodynamic cycle and typically deliver said heat to a second medium via a heat exchanger are mostly used when it comes to cooling in electric machines.

Due to a suitable selection of the geometry within the electric machine, a flow network is produced within the electric machine, by means of which network the components to be cooled are supplied with coolant. The geometry of the flow network defines a ratio of coolant mass flows in which the individual active component parts, for example rotor, stator, laminated core end zones, the stator winding region and/or laminated core and tabs at the stator winding head, are cooled. For a given electric machine, the geometry of the flow network and therefore the ratio of the coolant mass flows to one another are defined, which results in a likewise defined cooling ratio. For electric machines in the prior art, it is typically not possible to actively influence this ratio of the cooling mass flows to one another. In particular, it is thus impossible to adapt the cooling to different operating states of the electric machine.

SUMMARY OF INVENTION

An object of the invention is to overcome these disadvantages in the prior art, whereby the cooling of individual component parts of the electric machine can be adapted to different operating states, and in addition a higher development of heat, as encountered with increased performance of the electric machine, can be compensated for on account of the resultant more efficient cooling. An overshoot of the permissible limit value temperatures can thus be avoided. In addition, the service life of the electric machine according to the invention increases, since an additional loading by excessively high temperatures is avoided. The electric machine according to the invention comprises a stator, a rotor, a first fan and a fan directing element. The rotor is arranged on an axis of rotation. The first fan extends on a portion of the axis of rotation in the radial direction and delivers a coolant flow into the electric machine during operation.

The state "during operation" is to be understood here to mean that the axis of rotation rotates about its longitudinal axis. This rotation can be performed by a drive, for example by a turbine or a combustion engine, whereby a corresponding rotational movement is impressed onto the axis of rotation of the electric machine. In addition, the term "during operation" is also understood to mean states of the electric machine in which the axis of rotation rotates about its longitudinal axis without the axis of rotation being subjected to a further rotational movement, for example by the engine and/or a turbine. This form of operation could also be referred to as no-load operation, in which the electric machine cools down and/or the mechanical connection between the axis and the combustion engine and/or the turbine as drive assembly is interrupted, for example by releasing a corresponding coupling. In addition, the term "during operation" also includes states in which the electric machine provides only a fraction of its maximum possible performance. A full utilization of the performance of the electric machine may also occur "during operation" of the electric machine.

The fan directing element cooperates with the fan and deflects at least one proportion of the coolant flow delivered by the fan into the electric machine. The electric machine according to the invention has the advantage that the cooling of individual constituent parts of the electric machine can be selectively controlled by the at least one deflected proportion of the coolant flow and therefore can be adapted to the different operating states of the electric machine. The maximum permissible power consumption of the electric machine is thus increased, as is the service life thereof, since wear is reduced on account of the more efficient cooling according to the invention.

The fan directing element is embodied such that it projects behind blades of the first fan in the radial direction at least over a portion. The term "project behind" is to be understood such that the fan directing element encroaches on the cross section of the fan. The cross section of the fan describes an area through which the fan can convey coolant. Under consideration of the fan from the inside of the machine, the fan directing element protrudes into the cross section of the fan; more specifically at a position along the axis of rotation of the fan that lies behind the fan, in particular inside the electric machine.

As a result of this embodiment of the fan directing element, existing electric machines can also be easily provided with the cooling functionality according to the invention.

The electric machine according to the invention comprises a fan directing element that is adjustable. The at least one proportion of the coolant flow can thus be varied. This is advantageous in order to adapt the deflected proportion of the coolant flow (i.e. the deflected coolant proportion) to different operating states of the electric machine.

Due to the variable at least one proportion of the coolant flow, a ratio at which active component parts of the electric machine can be cooled can also be modified. This means that the ratio at which for example the stator and/or rotor can be cooled can be modified selectively, on account of the at least one proportion of the coolant flow.

The fan element is further embodied as a fan directing ring, which protrudes behind the blades of the first fan, at least over a portion, in the radial direction. This embodiment has the advantage that, for specific azimuthal positions, a desired proportion of the coolant flow can be deflected to active component parts located in the vicinity of these azimuthal positions. This results in an additional degree of freedom in the deflection of the at least one proportion of the coolant flow.

The electric machine further comprises a fan directing element which comprises at least one guide channel in order to deflect the at least one proportion of the coolant flow.

The electric machine further comprises at least one stator winding of the stator.

For the electric machine, the at least one variable proportion of the cooling flow can further be adapted to an operating state of the electric machine. It is thus possible to selectively achieve a more efficient cooling of active component parts of the electric machine. The maximum possible performance of the electric machine as well as the service life thereof are thus increased, since wear caused by an excessively high operating temperature is reduced.

The electric machine further comprises a one-stage fan as first fan. The fan can thus be provided economically.

The electric machine further comprises a second fan, which extends on a portion of the axis of rotation in the radial direction and delivers a second coolant flow into the electric machine during operation, wherein a second fan directing element co-operates with the second fan and deflects at least one proportion of the second coolant flow.

The second fan directing element of the electric machine advantageously protrudes behind the blades of the second fan in the radial direction, at least over a portion.

The electric machine further comprises the second fan directing element, wherein the second fan directing element is embodied as a fan directing ring, which protrudes behind the blades of the second fan in the radial direction, at least over a portion.

The second fan directing element is advantageously adjustable, such that the at least one proportion of the second coolant flow can be varied.

The advantages already explained in conjunction with the first fan and the first fan directing element also apply correspondingly to the embodiments explained in conjunction with the second fan and/or the second fan directing element. In addition, the mass flow of coolant delivered into the electric machine is increased by the second fan in conjunction with the second fan directing element, whereby a cooling power, in particular in respect of active component parts, is further increased. The electric machine is advantageously a generator and/or an electric motor.

A gaseous coolant is advantageously used as coolant for the electric machine according to the invention. Possible gaseous coolants include, in particular, air, purified air or hydrogen. A person skilled in the art will understand immediately that additional protective measures are necessary with the use of hydrogen, however these protective measures do not need to be explained further here for the understanding of the invention.

It is also conceivable, without limitation, to use a liquid as coolant, for example water and/or generator oil. The liquid coolant may either flow freely in the electric machine or may circulate therein in networks provided for this purpose.

BRIEF DESCRIPTION OF THE DRAWINGS

The above describe properties, features and advantages of the present invention and also the way in which these are achieved will be understood more clearly and precisely in conjunction with the following description of the exemplary embodiments, which will be explained in greater detail in conjunction with the accompanying drawing, in which FIG. 1 shows a cross section through a portion of an electric machine 1.

DETAILED DESCRIPTION OF THE INVENTION

As can be seen from FIG. 1, the electric machine 1 according to the invention comprises an axis of rotation 5, about which a rotor 4 is arranged, as is known, such that, in the event of rotation of the axis of rotation 5, said rotor also rotates about the axis of rotation 5, as indicated by the double-headed arrow. The electric machine 1 also comprises a stator 2, which is mounted in the electric machine 1 in a stationary manner in contrast to the rotating rotor. It is known to a person skilled in the art that the rotor 4 and/or the stator 2 may advantageously be constructed from sheet metals insulated with respect to one another. The electric machine 1 according to the present invention additionally comprises a fan 8, 8a, which is arranged on the axis of rotation 5 and of which the blades extend in a radial direction in relation to the axis of rotation. The fan 8, 8a delivers a coolant into the interior of the electric machine 1 during operation, i.e. during rotation about the axis of rotation 5.

A person skilled in the art will understand that the illustration in FIG. 1 shows only a detail of the electric machine 1. The second end portion of the axis of rotation and the further structure are provided substantially in a mirror image, which is indicated by the break-off lines in the middle. The horizontal upper break-off line is intended to indicate that the electric machine 1 may also comprise further constituent parts, however these are not necessary for the understanding of the invention.

A person skilled in the art will therefore also understand that the fan 8, 8a shown in FIG. 1 is representative of a first fan 8 and a second fan 8a, which would be located on the other end portion of the axis of rotation 5. The second fan 8a is optional.

The electric machine 1 of the present invention comprises a fan directing element 10, which cooperates with the first fan 8. As shown, the fan directing element 10 engages or projects behind the first fan 8 downstream of the first fan 8, whereby the first fan 8 delivers a coolant flow or cooling mass flow from outside the electric machine 1 into the inside.

The fan directing element 10, 10a may comprise at least one guide channel 12a, 12b in order to deflect at least one proportion of the coolant flow. In the illustration shown in FIG. 1 a first guide channel 12a serves to deflect a first proportion of the coolant flow and a second guide channel 12b serves to deflect a second proportion of the coolant flow. Without limitation, the fan directing element 10 could also comprise more than one or two of the guide channels 12a, 12b. In addition, the guide element 10, 10a shown in FIG. 1 is shown only in a sectional illustration, however it may also be, without limitation, a fan directing element 10 embodied as a fan directing ring, whereby, at desired azimuthal positions, suitable proportions from the coolant flow (not shown) can be deflected in order to selectively cool individual, in particular active components of the electric machine 1. A person skilled in the art will understand that a selective cooling of active components of the electric machine 1 is possible by the arrangement of the fan directing elements 8, 8a at different azimuthal positions.

In accordance with the invention the fan directing elements 10, 10a can also be embodied as adjustable fan directing elements 10, 10a, whereby the proportion of the coolant flow that can be deflected by the adjustable fan directing element can be adapted to an operating state of the electric machine 1. It is thus possible to increase the coolant flow for a desired component part, for example the stator head winding 2a, for example by moving the boundary between the first guide channel 12a and second guide channel 12b such that the second guide channel 12b (the lower one in FIG. 1) is made smaller, whereas the upper first guide channel 12a is made bigger. This means that in this adjustment a greater proportion of the coolant flow is delivered to the stator head windings 2a, such that these can cool more quickly. A person skilled in the art will also understand that a second fan 8a and a second fan directing element 10a, which are in turn equipped with one or more guide channels 12a, 12b, can be mounted on the second end portion of the axis of rotation 5. In this respect, the illustrations in FIG. 1 in respect of the fan 8 and the guide element 10 are also representative for a second fan 8a and a second guide element 10a, which can be mounted on a second portion of the axis of rotation 5 and delivers a second coolant flow (not shown) correspondingly into the interior of the electric machine 1.

A person skilled in the art will also understand that the deflected proportions of the coolant flow can be selectively adapted to an operating state of the electric machine as a result of the modifiable proportions of the coolant flow deflected by the respective fan directing element 10, 10a. For example, it may be of interest to especially cool the rotor 2 and/or the stator 4 during the power consumption of the electric apparatus 1, whereas a cooling of the stator windings 2a can be supported as the electric machine 1 is drained, i.e. when no more power is transferred to the axis of rotation 5 on the drive side, by directing the deflected proportions of the coolant flow increasingly to the stator windings 2a. In addition, adaptations of the deflected coolant flow to different load points of the electric machine are of course possible, i.e. operating states in which the electric machine is operated with different proportions of the maximum possible load.

A person skilled in the art will also understand that the fan directing element according to the invention can be used both in conjunction with gaseous and with liquid coolants. In the case of gaseous coolants, air, purified air and/or hydrogen can be considered, for example. Hydrogen is advantageous insofar as the heat capacity thereof and therefore ability thereof to provide effective cooling are higher. However, it is known to a person skilled in the art that the use of hydrogen as coolant requires further safety precautions, in particular in order to avoid an oxyhydrogen explosion.

In principle, it is also conceivable for the fan directing ring or the fan directing element 10, 10a proposed in accordance with the invention to be used in conjunction with liquid coolant, such as water and/or generator oil. In conjunction with water, it may be advantageous to provide special lines for this in order to avoid short circuits within the electric machine. These measures, however, are known to a person skilled in the art, and therefore the dimensioning of a corresponding line system does not need to be discussed here in greater detail. In conjunction with generator oil as liquid coolant, the requirements in respect of special cooling lines can be relaxed, if the generator oil itself is not electrically conductive.

The fan 8, 8a shown in FIG. 1 is shown as a one-stage fan. This is advantageous since the pressure of the flowing coolant downstream of the fan 8, 8a is not reduced, as would be the case for example with a multi-stage fan. It is conceivable however, without limitation, to also use the fan directing element 10, 10a according to the invention in conjunction with a multi-stage fan.

It is also clear to a person skilled in the art that the embodiments and advantages described in conjunction with the first fan 8 and the first fan directing element 10 also apply to the second fan 8a and a corresponding second fan directing element 10a, which are located at a second end portion, typically the second end portion, of the axis of rotation 5.

The fan directing element 10, 10a has been described in conjunction with a first and second fan directing element. However, without limitations, more than two fan directing elements can also be used, which are formed either as individual parts or as constituent parts of a fan directing ring comprising the plurality of fan directing elements 10, 10a.

Although the invention has been illustrated and described in greater detail by the preferred exemplary embodiments, the invention is not limited by the disclosed examples, and other variations can be derived herefrom by a person skilled in the art, without departing from the scope of protection of the invention.

The invention claimed is:

1. An electric machine comprising:
   a stator,
   a rotor, which is arranged on an axis of rotation,
   a first fan, which extends on a portion of the axis of rotation in a radial direction and delivers a coolant flow into the electric machine during operation, and
   a fan directing element which cooperates with the first fan and deflects at least one proportion of the coolant flow,
   wherein the fan directing element projects radially inward behind blades of the first fan, and
   wherein the fan directing element is adjustable, such that the at least one proportion of the coolant flow can be varied,
   the electric machine further comprising:
   a second fan, which extends on a portion of the axis of rotation in the radial direction and delivers a second coolant flow into the electric machine during operation, and
   a second fan directing element which cooperates with the second fan and deflects at least one proportion of the second coolant flow.

2. The electric machine as claimed in claim 1, wherein the fan directing element is embodied as a fan directing ring, which projects radially inward behind the blades of the first fan.

3. The electric machine as claimed in claim 1, wherein the fan directing element comprises at least one guide channel in order to deflect the at least one proportion of the coolant flow.

4. The electric machine as claimed in claim 1, wherein the stator comprises at least one stator winding.

5. The electric machine as claimed in claim 1, wherein the first fan is a one-stage fan.

6. The electric machine as claimed in claim 1,
wherein the second fan directing element projects radially inward behind blades of the second fan.

7. The electric machine as claimed in claim 1,
wherein the second fan directing element is formed as a fan directing ring, which projects radially inward behind the blades of the second fan.

8. The electric machine as claimed in claim 6,
wherein the second fan directing element is adjustable, such that the at least one proportion of the second coolant flow can be varied.

9. The electric machine as claimed in claim 1,
wherein the electric machine is a generator or an electric motor or a three-phase motor.

10. The electric machine as claimed in claim 1,
wherein coolant of the coolant flow is a gaseous coolant, air, purified air, or hydrogen.

\* \* \* \* \*